(12) United States Patent
Abe et al.

(10) Patent No.: US 7,388,739 B2
(45) Date of Patent: Jun. 17, 2008

(54) GREEN SHEET COATING MATERIAL, GREEN SHEET, PRODUCTION METHOD OF GREEN SHEET AND PRODUCTION METHOD OF ELECTRONIC DEVICE

(75) Inventors: Kyotaro Abe, Chuo-ku (JP); Hisashi Kobayashi, Chuo-ku (JP); Shigeki Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 266 days.

(21) Appl. No.: 10/550,956

(22) PCT Filed: Mar. 17, 2004

(86) PCT No.: PCT/JP2004/003517

§ 371 (c)(1),
(2), (4) Date: Sep. 28, 2005

(87) PCT Pub. No.: WO2004/087614

PCT Pub. Date: Oct. 14, 2004

(65) Prior Publication Data

US 2006/0199033 A1    Sep. 7, 2006

(30) Foreign Application Priority Data

Mar. 31, 2003   (JP)   ............................. 2003-095546

(51) Int. Cl.
*H01G 4/06* (2006.01)

(52) U.S. Cl. ............... 361/321.1; 361/321.2; 361/302; 361/303; 361/311; 361/312; 361/313

(58) Field of Classification Search ............ 361/321.1, 361/321.2, 321.4, 321.5, 311–313, 306.1, 361/306.3, 302–305

See application file for complete search history.

(56) References Cited

U.S. PATENT DOCUMENTS

| 5,004,640 | A | * | 4/1991 | Nakatani et al. | ......... 428/195.1 |
| 5,683,790 | A | * | 11/1997 | Suzuki et al. | ............... 428/210 |
| 6,263,552 | B1 | * | 7/2001 | Takeuchi et al. | ........... 29/25.35 |
| 6,749,768 | B2 | * | 6/2004 | Endo et al. | ............... 252/62.63 |
| 7,105,070 | B2 | * | 9/2006 | Tosa et al. | ............... 156/89.12 |
| 2007/0023124 | A1 | * | 2/2007 | Kobayashi et al. | ...... 156/89.12 |

FOREIGN PATENT DOCUMENTS

| JP | A-05-279108 | 10/1993 |
| JP | A 06-200229 | 7/1994 |
| JP | A-06-206756 | 7/1994 |
| JP | A-07-099132 | 4/1995 |
| JP | B2-2625753 | 4/1997 |
| JP | A-10-067567 | 3/1998 |
| JP | A-10-166343 | 6/1998 |
| JP | A 2000-133547 | 5/2000 |
| JP | A-2001-106580 | 4/2001 |
| JP | A-2002-043161 | 2/2002 |
| JP | A-2002-104878 | 4/2002 |

* cited by examiner

*Primary Examiner*—Nguyen T. Ha
(74) *Attorney, Agent, or Firm*—Oliff & Berridge, PLC

(57) ABSTRACT

A green sheet coating material includes ceramic powder and a binder resin containing a butyral based resin as the main component, which furthermore includes a xylene based resin as a tackifier. The xylene based resin is included in a range of 1.0 wt % or less, more preferably 0.1 or more and 1.0 wt % or less, and particularly preferably more than 0.1 and 1.0 wt % or less with respect to 100 parts by weight of ceramic powder.

9 Claims, 2 Drawing Sheets

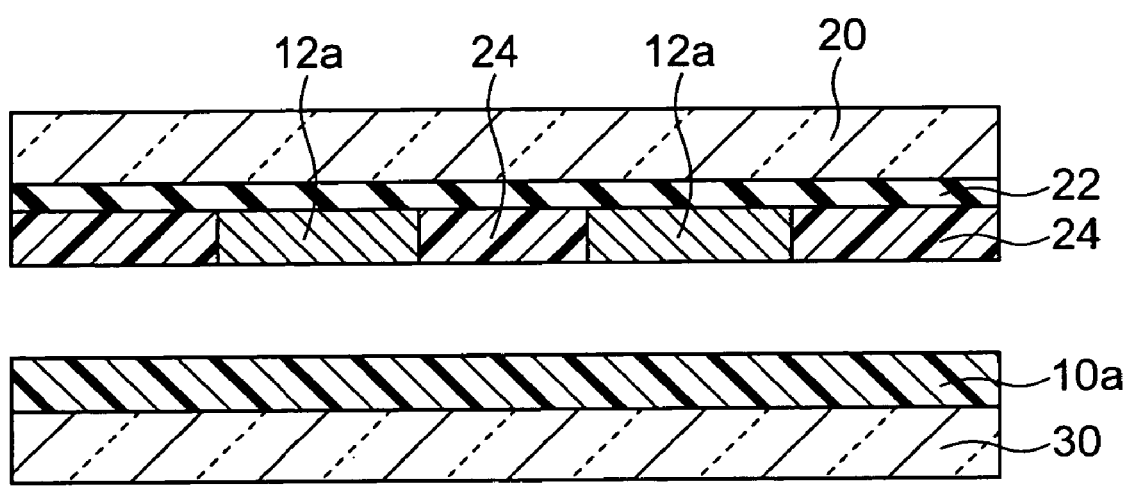

GREEN SHEET COATING MATERIAL, GREEN SHEET, PRODUCTION METHOD OF GREEN SHEET AND PRODUCTION METHOD OF ELECTRONIC DEVICE

TECHNICAL FIELD

The present invention relates to a green sheet coating material, a green sheet, a production method of a green sheet coating material a production method of a green sheet, and a production method of an electronic device and, particularly relates to a coating material, green sheet and a method capable of producing a green sheet having excellent handlability and adhesiveness even in the case of an extremely thin sheet and suitable to making an electronic device a thin layer and multilayer.

BACKGROUND ART

In recent years, as a variety of electronic equipments become compact, electronic devices to be installed inside the electronic equipments have become more compact and higher in performance. As one of the electronic devices, there is a ceramic electronic device, such as a CR built-in substrate and a multilayer ceramic capacitor, and the ceramic electronic devices have been required to be more compact and higher in performance.

To pursue a more compact ceramic electronic device having a higher capacity, there is a strong demand for making a dielectric layer thinner. Recently, a thickness of a dielectric green sheet composing a dielectric layer has become a several μm or less.

To produce a ceramic green sheet, normally, a ceramic coating material composed of ceramic powder, a binder (an acrylic based resin and a butyral based resin, etc.), a plasticizer (phthalate esters, glycols, adipic acids, and phosphoric esters) and an organic solvent (toluene, MEK and acetone, etc.). Next, the ceramic coating material coated on a carrier sheet (a supporting body made by PET and PP) by using the doctor blade method, etc. and dried by heating.

Also, a method of producing by preparing a ceramic suspension wherein the ceramic powder and binder are mixed in a solvent, then, biaxial stretching a film-shaped molded item obtained by molding the suspension has been considered in recent years.

A method of producing a multilayer ceramic capacitor by using the ceramic green sheet explained above will be explained in detail. An internal electrode conductive paste containing metal powder and a binder is printed to be a predetermined pattern on the ceramic green sheet and dried to form an internal electrode pattern. After that, the green sheet is peeled from the carrier sheet and stacked by a predetermined number of layers. Here, two methods are proposed, that are a method of peeling the green sheet from the carrier sheet before stacking in layers and a method of peeling the carrier sheet after stacking in layers and adhering by compression, but the difference is not large. Finally, the stacked body is cut to be chips, so that green chips are prepared. After firing the green chips, external electrodes are formed, so that a multilayer ceramic capacitor and other electronic devices are produced.

When producing a multilayer ceramic capacitor, an interlayer thickness of sheets formed with internal electrodes is in a range of 3 μm to 100 μm or so based on a desired capacitance required as a capacitor. Also, in a multilayer ceramic capacitor, a part not formed with internal electrodes is formed on an outer part in the stacking direction of the capacitor chip.

In such a multilayer ceramic capacitor, a polyvinyl butyral resin having a polymerization degree of 1000 or less (Mw=50,000) is used as a binder in some cases (refer to the Japanese Patent Publication No. 10-67567). However, in the case of using a normal polyvinyl butyral resin as a binder, there are problems that adhesiveness declines and stacking becomes difficult when a thickness of the green sheet becomes thin.

In recent years, as electronic equipments become more compact, electronic devices to be used therein have rapidly become more compact. In multilayer electronic devices as typified by a multilayer ceramic capacitor, rapid development has been made on increasing the number of layers to be stacked and attaining a thinner interlayer thickness. To respond to the technical trends, a thickness of a green sheet, which determines the interlayer thickness, has almost become 3 μm or less to 2 μm or less. Therefore, in a production process of a multilayer ceramic capacitor, it is necessary to handle extremely thin green sheets and to design very advanced green sheet properties.

As characteristics required as the properties of such an extremely thin green sheet, sheet strength, flexibility, smoothness, adhesiveness when being stacked, handlability (electrostatic property), etc. may be mentioned, and balance of a higher order is required.

Note that, as shown in the Japanese Unexamined Patent Publication No. 6-206756, there is known a technique of using a polyvinyl butyral resin having a polymerization degree of 1000 or more as a binder in green sheet slurry containing an aqueous solvent for a purpose of eliminating a short-circuiting defect.

However, the Japanese Unexamined Patent Publication No. 6-206756 is not for particularly attaining a thinner organic solvent based green sheet, and it also has problems that the adhesiveness declines and stacking becomes difficult when a thickness of the green sheet is made thin.

Also, as a method of improving adhesiveness of the green sheet, as shown in the Japanese Unexamined Patent Publication No. 5-279108, there is known a method of making a hot-melt adhesive, such as rosin, contained in dielectric slurry. However, in this method, adhesiveness at a high temperature can be expected but it does not lead to an improvement of adhesive strength at a normal temperature and, when the dielectric layer is made thin, adhesive strength at a normal temperature is insufficient and stacking is not easy.

Furthermore, as disclosed in the Japanese Unexamined Patent Publication No. 7-99132, a method of using a water-soluble polyvinyl acetal resin as a binder resin and adding amines as a plasticizer is proposed. However, in this method, the binder resin and the plasticizer are selected only considering the adhesiveness, and other sheet properties, such as tensile strength and surface roughness, may decline when the dielectric layer is made thin.

Furthermore, as disclosed in the Japanese Unexamined Patent Publication No. 10-166343, there is provided a method of applying to a surface of the green sheet a self-adhesion inductive liquid for dissolving or swelling a binder resin in a green sheet. However, in this method, a step of applying the liquid on the surface of the produced green sheet is furthermore added, so that the procedure becomes cumbersome and complicated.

Also, as disclosed in the Japanese Unexamined Patent Publication No. 13-106580, a method of using a polyvinyl acetal resin as a binder resin and adding phthalate ester based, glycol based and amino alcohol based plasticizers as a plasticizer is proposed. However, in this method, a plurality of kinds of plasticizers are used and other sheet properties, such as tensile strength and surface roughness, decline when the dielectric layer is made thin.

Furthermore, as disclosed in the Japanese Unexamined Patent Publication No. 14-104878, a method of mixing a plurality of kinds of polyvinyl acetal resins as a binder is proposed. However, in this method, mixing of resin kinds is performed by only considering an improvement of the adhesiveness, and other sheet properties, such as tensile strength and surface roughness, decline when the dielectric layer is made thin.

DISCLOSURE OF THE INVENTION

An object of the present invention is to provide a green sheet coating material, a green sheet, a production method of a green sheet coating material and a production method of a green sheet capable of producing a green sheet having enough strength to be peeled from a supporting body, preferable adhesiveness and handlability even if the green sheet is extremely thin. Also, another object of the present invention is to provide a production method of an electronic device suitable to be made thin and multilayer.

The present inventors have been committed themselves to study to attain the above objects, found that it was possible to produce a green sheet having enough strength to be peeled from a supporting body, preferable adhesiveness and handlability even if the green sheet was extremely thin, by using as a binder a polyvinyl acetal resin or other butyral based resin and using a xylene based resin as a tackifier, and completed the present invention.

Namely, a green sheet coating material according to the present invention comprises ceramic powder and a binder resin containing a butyral based resin as the main component; and furthermore comprising a xylene based resin as a tackifier.

A xylene resin is not particularly limited and an addition condensation resin of methaxylene and formalin, and those obtained by modifying the addition condensation resin by a variety of phenols and alcohol may be mentioned. A preferable average molecular weight of a xylene based resin in the present invention is 200 to 600 in those not modified. Those modified are not limited to this.

By combining a binder resin including a butyral based resin as the main component and an adhesive agent made by a xylene based resin, it becomes possible to produce a green sheet having enough strength to be peeled from a supporting body, preferable adhesiveness and handlability even when the green sheet is extremely thin. For example, it becomes possible to make a thickness of the dielectric layer after firing (a green sheet after firing) to 5 µm or less, preferably 3 µm or less, and more preferably 2 µm or less. Also, the number of layers to be stacked can be increased.

Preferably, said xylene based resin is contained in a range of 1.0 wt % or less, more preferably 0.1 or more and 1.0 wt % or less, and particularly preferably more than 0.1 and 1.0 wt % or less with respect to 100 parts by weight of said ceramic powder. When a content of the xylene resin is too small, the adhesiveness tends to decline. While when the content is too much, although the adhesiveness improves, it is liable that the sheet surface roughness becomes rougher, stacking of the layers by a large number becomes difficult, tensile strength of the sheet declines, and handlability of the sheet declines.

Preferably, said butyral based resin is a polybutyral resin; and a polymerization degree of said polybutyral resin is 1000 or higher and 1700 or lower, a butyralation degree of the resin is higher than 64% and lower than 78%, and a residual acetyl group amount is less than 6%.

When a polymerization degree of the polybutyral resin is too small, it is liable that sufficient mechanical strength is hard to be obtained when the layer is made as thin as, for example, 5 µm or less, and preferably 3 µm or less. While, when the polymerization degree is too large, the surface roughness tends to deteriorate when made to be a sheet. Also, when a butyralation degree of the polybutyral resin is too low, solubility to the coating material tends to decline, while when too high, sheet surface roughness tends to decline. Furthermore, when a residual acetyl group amount is too much, the sheet surface roughness tends to increase.

Preferably, wherein said binder resin is contained by 5 parts by weight or more and 6.5 parts by weight or less with respect to 100 parts by weight of said ceramic powder. When a content of the binder resin is too small, it is liable that the sheet strength declines and stackability (adhesiveness at the time of stacking) deteriorates. Also, when the content of the binder resin is too much, it is liable that segregation of the binder resin is caused to deteriorate the dispersibility, and sheet surface roughness deteriorates.

Preferably, dioctyl phthalate is contained as the plasticizer by 40 parts by weight or more and 70 parts by weight or less with respect to 100 parts by weight of the binder resin. Comparing with other plasticizers, dioctyl phthalate is preferable in terms of both of sheet strength and sheet ductility, and particularly preferable because the release strength from a supporting body is small and it is easily peeled. Note that when a content of the plasticizer is too small, it is liable that sheet stretching becomes less and flexibility becomes less. Also, when the content is too large, it is liable that bleeding of the plasticizer from the sheet is caused, segregation of the plasticizer is easily caused against the sheet, and the sheet dispersibility declines.

A production method of a ceramic green sheet according to the present invention includes:

a step of preparing the above green sheet coating material; and a step of forming a ceramic green sheet by using the green sheet coating material.

A production method of a ceramic electronic device according to the present invention includes:

a step of preparing the above green sheet coating material;

a step of forming a ceramic green sheet by using the green sheet coating material;

a step of drying the green sheet;

a step of stacking dried green sheets via internal electrode layers to obtain a green chip; and a step of firing the green chip.

The green sheet according to the present invention is produced by using the above green sheet coating material.

BRIEF DESCRIPTION OF DRAWINGS

FIG. 2 is a sectional view of a key part showing a production procedure of the multilayer ceramic capacitor shown in FIG. 1.

BEST MODE FOR CARRYING OUT THE INVENTION

Figure 1:
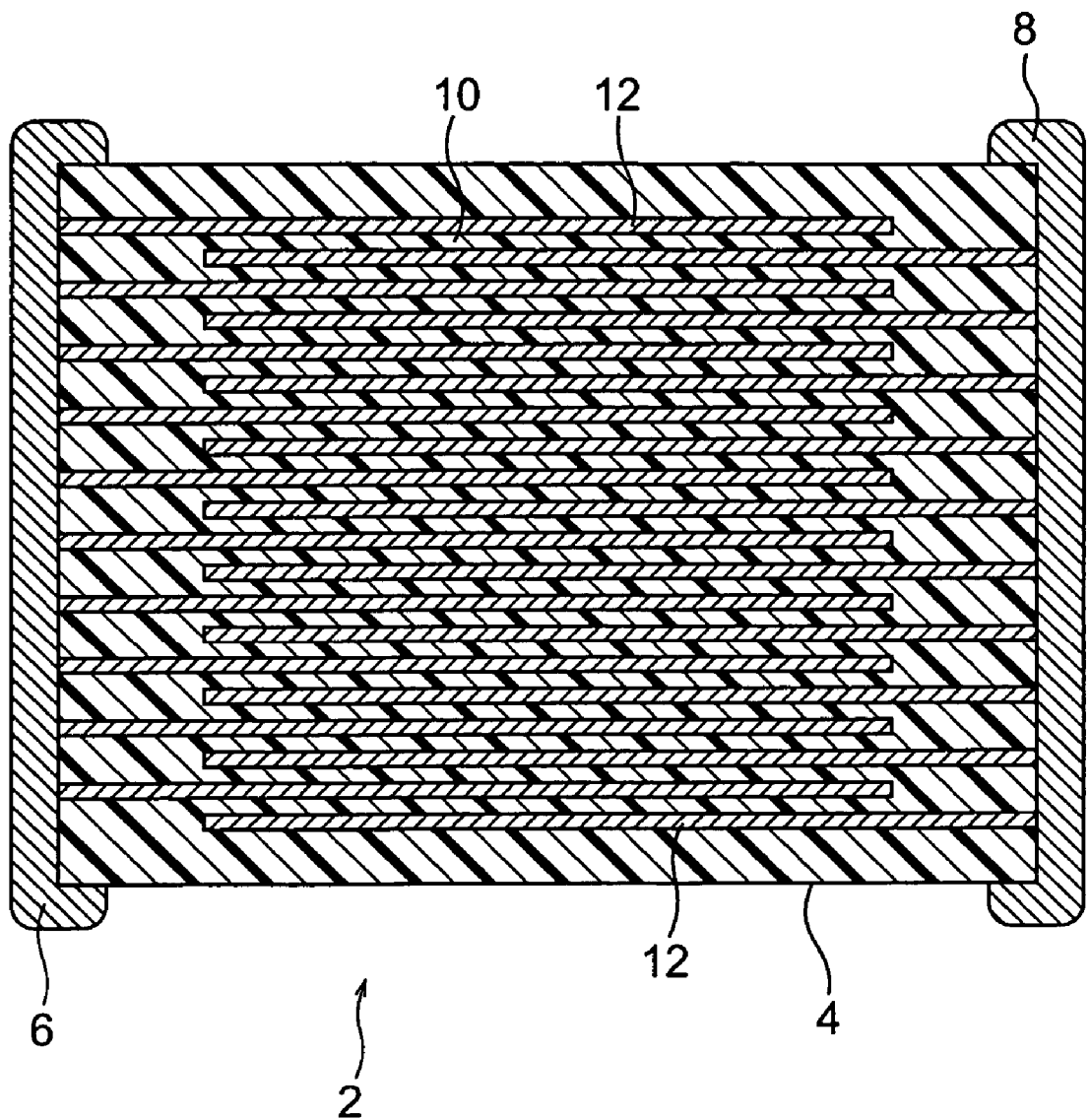
FIG. 1 is a schematic sectional view of a multilayer ceramic capacitor according to an embodiment of the present invention.

Below, the present invention will be explained based on the embodiment shown in the drawings.

First, as an embodiment of an electronic device produced by using a green sheet coating material (dielectric paste) and a green sheet according to the present invention, an overall configuration of a multilayer ceramic capacitor will be explained.

As shown in FIG. 1, a multilayer ceramic capacitor 2 according to the present embodiment comprises a capacitor element 4, a first terminal electrode 6 and a second terminal electrode 8. The capacitor element 4 comprises dielectric layers 10 and internal electrode layers 12, and the internal electrode layers 12 are stacked alternately between the dielectric layers 10. The alternately stacked internal electrode layers 12 on one side are electrically connected to inside of the first terminal electrode 6 formed at one end portion of the capacitor element 4. Also, the alternately stacked internal electrode layers 12 on the other side are electrically connected to inside of the second terminal electrode 8 formed at the other end portion of the capacitor element 4.

A material of the dielectric layer 10 is not particularly limited and composed of a dielectric material, for example, calcium titanate, strontium titanate and/or barium titanate, etc. A thickness of each of the dielectric layers 10 is not particularly limited, but those having a thickness of several µm to several hundreds of µm are general. Particularly in the present embodiment, it is made to be thin as preferably 5 µm or less, and more preferably 3 µm or less.

A material of the terminal electrodes 6 and 8 is not particularly limited, either, and copper, a copper alloy, nickel and a nickel alloy, etc. are normally used. A silver and an alloy of silver with palladium may be also used. A thickness of the terminal electrodes 6 and 8 is not particularly limited, either, but is normally 10 to 50 µm or so.

A shape and size of the multilayer ceramic capacitor 2 may be suitably determined in accordance with the object and use. When the multilayer ceramic capacitor 2 has a rectangular parallelepiped shape, it is normally a length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Next, an example of production methods of the multilayer ceramic capacitor 2 according to the present embodiment will be explained.

(1) First, a dielectric coating material (green sheet coating material) is prepared to produce a ceramic green sheet for composing the dielectric layers 10 shown in FIG. 1 after firing.

The dielectric coating material is composed of an organic solvent based coating material obtained by kneading a dielectric material (ceramic powder) and an organic vehicle.

The dielectric material is suitably selected from a variety of compounds which become composite oxides or oxides, such as carbonates, nitrites, hydroxides, and organic metal compounds, and mixed for use. The dielectric material is normally used as powder having an average particle diameter of 0.1 to 0.3 µm or less, and preferably 0.4 µm or less or so. Note that it is preferable to use finer powder than the green sheet thickness to form an extremely thin green sheet.

The organic vehicle is obtained by dissolving a binder resin in an organic solvent. As the binder resin used for the organic vehicle, a polyvinyl butyral resin is used in the present embodiment. A polymerization degree of the polybutyral resin is 1000 or higher and 1700 or lower, and preferably 1400 to 1700. Also, a butyralation degree of the resin is higher than 64% and smaller than 78%, and preferably higher than 64% and 70% or lower, and the residual acetyl group amount is less than 6% and preferably 3% or less.

The polymerization degree of the polybutyral resin can be measured, for example, by a polymerization degree of a polyvinyl acetal resin as a material. Also, the butyralation degree can be measured, for example, based on the JISK6728. Furthermore, the residual acetyl group amount can be measured based on the JISK6728.

When the polymerization degree of the polybutyral resin is too low, it is liable that sufficient mechanical strength is hard to be obtained when made to be a thin film of, for example, 5 µm or less, and preferably 3 µm or less or so. Also, when the polymerization degree is too large, surface roughness tends to increace when made to be a sheet. Also, when the butyralation degree of the polybutyral resin is too low, solubility in a coating material tends to decline, while when too high, sheet surface roughness tends to increase. Furthermore, when the residual acetyl group amount is too large, sheet surface roughness tends to increace.

An organic solvent to be used for an organic vehicle is not particularly limited and an organic solvent, such as terpinenol, alcohol, butyl carbitol, acetone and toluene, is used. In the present embodiment, the organic solvent preferably contains an alcohol based solvent and an aromatic solvent, and the aromatic solvent is contained by 10 parts by weight or more and 20 parts by weight or less when assuming total weight of the alcohol based solvent and aromatic solvent is 100 parts by weight. When a content of the aromatic solvent is too small, sheet surface roughness tends to increase, while when too large, the coating material filtration properties decline and sheet surface roughness also increase.

As an alcohol based solvent, methanol, ethanol, propanol and butanol, etc. may be mentioned. As an aromatic solvent, toluene, xylene and benzyl acetate, etc. may be mentioned.

It is preferable that a binder resin is dissolved in an alcohol based solvent of at least one kind of methanol, ethanol, propanol and butanol and filtered to be a solution in advance, and dielectric powder and other components are added to the solution. A binder resin having a high polymerization degree is hard to be dissolved in a solvent, and dispersibility of a coating material tends to decline in a normal method. In a method of the present embodiment, a binder resin having a high polymerization degree is dissolved in the above good solvent and ceramic powder and other components are added to the solution, so that dispersibility of a coating material can be improved and generation of undissolved resin can be suppressed. Note that solid content concentration cannot be raised and changes of lacquer viscosity tend to become large over time in the case of a solvent other than the above solvents.

In the present embodiment, the dielectric coating material is added with a xylene based resin as a tackifier together with the binder resin. The xylene based resin is added in a range of 1.0 wt % or less, more preferably 0.1 or more and 1.0 wt % or less, and particularly preferably more than 0.1 and 1.0 wt % or less with respect to 100 parts by weight of ceramic powder. When the adding quantity of the xylene based resin is too small, the adhesiveness tends to decline. When the adding quantity is too much, although the adhesiveness improves, it is liable that sheet surface roughness becomes rougher, stacking of layers by a large number becomes difficult, tensile strength of the sheet declines and handlability of the sheet declines.

In the dielectric coating material, additives selected from a variety of dispersants, plasticizers, antistatic agents, dielectrics, glass flit, and insulators may be included in accordance with need.

In the present embodiment, a dispersant is not particularly limited, but polyethylene glycol based nonionic dispersant is preferably used, and a hydrophile-lipophile balance (HLB) value thereof is 5 to 6. A dispersant is added by 0.5 part by weight or more and 1.5 parts by weight or less, and more preferably 0.5 part by weight or more and 1.0 part by weight or less with respect to 100 parts by weight of ceramic powder.

When the HLB is out of the above ranges, it is liable that coating material viscosity increases and sheet surface roughness increases. Also, in the case of a dispersant other than a polyethylene glycol based nonionic dispersant, coating material viscosity increases, sheet surface roughness increases and sheet ductility declines, so that it is not preferable.

When an adding quantity of a dispersant is too small, sheet surface roughness tends to increase, while when too large, sheet tensile strength and stackability tend to decline.

In the present embodiment, dioctyl phthalate is preferably used as a plasticizer and contained by an amount of preferably 40 parts by weight or more and 70 parts by weight or less, and more preferably 40 to 60 parts by weight with respect to 100 parts by weight of a binder resin. Comparing with other plasticizers, dioctyl phthalate is preferable in terms of both of sheet strength and sheet stretch and is particularly preferable for having weak peeling strength so as to be easily peeled from a supporting body. Note that when a content of the plasticizer is too small, it is liable that sheet stretch becomes less and flexibility becomes less. Also, when the content is too large, it is liable that bleeding of a plasticizer from a sheet is caused, segregation of the plasticizer against the sheet easily arises and dispersibility of the sheet declines.

Also, in the present embodiment, the dielectric coating material contains water by 1 part by weight or more and 6 parts by weight or less, and preferably 1 to 3 parts by weight with respect to 100 parts by weight of dielectric powder. When a water content is too small, changes of coating material characteristics due to moisture absorbance over time becomes large, coating material viscosity tends to increase and filtration properties of the coating material tend to decline. While when the water content is too large, separation and precipitation of the coating material are caused, the dispersibility becomes poor and surface roughness of the sheet tends to decline.

Furthermore, in the present embodiment, at least any one of a hydrocarbon based solvent, industrial gasoline, kerosene, and solvent naphtha is added by preferably 3 parts by weight or more and 15 parts by weight or less, and more preferably 5 to 10 parts by weight with respect to 100 parts by weight of dielectric powder. By adding these additives, sheet strength and sheet surface roughness can be improved. When an adding quantity of these additives is too small, effects of adding is small, while when the adding quantity is too large, it is liable that sheet strength and sheet surface roughness are deteriorated inversely.

A binder resin is contained preferably by 5 parts by weight or more and 6.5 parts by weight or less with respect to 100 parts by weight of dielectric powder. When a content of the binder resin is too small, it is liable that the sheet strength declines and stackability (adhesiveness at the time of stacking in layers) also declines. While when a content of the binder resin is too large, it is liable that segregation of the binder resin is caused to make the dispersibility worse and sheet surface roughness tends to increase.

When assuming that total volume of the ceramic powder, binder resin and plasticizer is 100 volume %, a volume ratio accounted by the dielectric powder is preferably 62.42% or more and 72.69% or less, and more preferably 63.93% or more and 72.69% or less. When the volume ratio is too small, it is liable that segregation of the binder is easily caused to make the dispersibility worse and surface roughness declines. Also, when the volume ratio is too large, it is liable that the sheet strength declines and the stackability also declines.

Furthermore, in the present embodiment, the dielectric coating material preferably includes an antistatic agent, and the antistatic agent is preferably imidazoline based antistatic agent. When the antistatic agent is not an imidazoline based antistatic agent, the antistatic effect is small and the sheet strength, sheet ductility or adhesiveness tends to decline.

An antistatic agent is contained by 0.1 part by weight or more and 0.75 part by weight or less, and more preferably 0.25 to 0.5 part by weight with respect to 100 parts by weight of ceramic powder. When an adding quantity of the antistatic agent is too small, the antistatic effect becomes small, while when too large, it is liable that surface roughness of the sheet increase and sheet strength declines. When the antistatic effect is too small, electrostatic easily arises when peeling the carrier sheet as a supporting body from the ceramic green sheet, and a disadvantage that the green sheet gets wrinkled, etc. easily arises.

By using the dielectric coating material, as shown in FIG. 2, a green sheet 10a is formed to be a thickness of preferably 0.5 to 30 μm, and more preferably 0.5 to 10 μm or so on the carrier sheet 30 as a supporting sheet by the doctor blade method, etc. The green sheet 10a is dried after being formed on the carrier sheet 30.

Temperature of drying the green sheet is preferably 50 to 100° C. and drying time is preferably 1 to 20 minutes. A thickness of the green sheet after drying is contracted to 5 to 25% of that before drying. The thickness of the green sheet 10a after drying is preferably 3 μm or less.

(2) A carrier sheet 20 is prepared separately from the above carrier sheet 30, and a release layer 22 is formed thereon. On top thereof, an electrode layer 12a having a predetermined pattern is formed. On a surface of the release layer 22 where the electrode layer 12a is not formed, a blank pattern layer 24 having substantially the same thickness as that of the electrode layer 12a is formed.

As the carrier sheets 20 and 30, for example, a PET film, etc. is used, and those coated with silicon, etc. are preferable to improve the release property. Thicknesses of the carrier sheets 20 and 30 are not particularly limited and are preferably 5 to 100 μm.

The release layer 22 preferably contains the same dielectric powder as the dielectric composing the green sheet 10a. Also, the release layer 22 contains a binder, a plasticizer and a release agent other than the dielectric powder. A particle diameter of the dielectric powder may be the same as that of the dielectric particles included in the green sheet but it is preferable to be smaller.

In the present embodiment, a thickness of the release layer 22 is preferably not more than a thickness of the electrode layer 12a, and more preferably, it is set to be a thickness of 60% or less, and further preferably 30% or less.

A method of applying the release layer 22 is not particularly limited, but it has to be formed to be extremely thin, so that an applying method using, for example, a wire bar coater or a die coater is preferable. Note that adjustment of the release layer 22 thickness can be made by selecting a wire bar coater having a different wire diameter. Namely, to make the thickness of the release layer 22 to be applied thinner, it can be done by selecting one having a small wire diameter, inversely, to form it thick, one with a large wire diameter may be selected. The release layer 22 is dried after being applied. The drying temperature is preferably 50 to 100° C. and the drying time is preferably 1 to 10 minutes.

A binder for the release layer 22 is composed, for example, of an acrylic resin, polyvinyl butyral, polyvinyl acetal, polyvinyl alcohol, polyolefin, polyurethane, polystyrene, or an organic composed of a copolymer of these or emulsion. The binder contained in the release layer 22 may be the same as the binder contained in the green sheet 10a or may be different from that, but preferably the same.

A plasticizer for the release layer 22 is not particularly limited and, for example, phthalate ester, dioctyl phthalate, adipic acid, phosphate ester and glycols, etc. may be mentioned. The plasticizer to be contained in the release layer 22 may be the same as that contained in the green sheet or may be different from that.

A release agent for the release layer 22 is not particularly limited and, for example, paraffin, wax and silicone oil, etc. may be mentioned. A release agent contained in the release layer 22 may be the same as that contained in the green sheet or may be different from that.

A binder is contained in the release layer 22 by preferably 2.5 to 200 parts by weight, more preferably 5 to 30 parts by weight, and particularly preferably 8 to 30 parts by weight or so with respect to 100 parts by weight of dielectric particle.

A plasticizer is preferably contained in the release layer 22 by 0 to 200 parts by weight, preferably 20 to 200 parts by weight, and more preferably 50 to 100 parts by weight with respect to 100 parts by weight of the binder.

A release agent is preferably contained in the release layer 22 by 0 to 100 parts by weight, preferably 2 to 50 parts by weight, and more preferably 5 to 20 parts by weight with respect to 100 parts by weight of the binder.

After forming the release layer 22 on the surface of the carrier sheet, an electrode layer 12a to compose an internal electrode layer 12 after firing is formed to be a predetermined pattern on the surface of the release layer 22. A thickness of the electrode layer 12a is preferably 0.1 to 2 μm, and more preferably 0.1 to 1.0 μm or so. The electrode layer 12a may be configured by a single layer or two or more layers having different compositions.

The electrode layer 12a can be formed on the surface of the release layer 22 by a thick film formation method, such as a printing method using an electrode coating material, or a thin film method, such as evaporation and sputtering. When forming the electrode layer 12a on the surface of the release layer 22 by a screen printing method or a gravure printing method as a kind of thick film method, it is as follows.

First, an electrode coating material is prepared. The electrode coating material is fabricated by kneading a conductive material composed of a variety of conductive metals and alloys, or a variety of oxides, organic metal compounds or resinates, etc. to be conductive materials after firing with an organic vehicle.

As a conductive material to be used when producing the electrode coating material, Ni, a Ni alloy and a mixture of these are used. A shape of the conductive materials is not particularly limited and may be a spherical shape and scale-like shape, etc. or a mixture of these shapes. Those having an average particle diameter of the conductive material of normally 0.1 to 2 μm, and preferably 0.2 to 1 μm or so may be used.

An organic vehicle contains a binder and a solvent. As the binder, for example, ethyl cellulose, an acrylic resin, polyvinyl butyral, polyvinyl acetal, polyvinyl alcohol, polyolefin, polyurethane, polystyrene, or a copolymer of these may be mentioned. Particularly, butyrals, such as polyvinyl butyral, are preferable.

The binder is contained in the electrode coating material by preferably 8 to 20 parts by weight with respect to 100 parts by weight of the conductive material (metal powder). As a solvent, any of well-known ones, such as terpionel, butylcarbitol and kerosene, may be used. A content of the solvent is preferably 20 to 55 wt % or so with respect to the entire coating material.

To improve the adhesiveness, the electrode coating material preferably contains a plasticizer. As a plasticizer, benzylbutyl phthalate (BBP) and other phthalate esters, adipic acids, phosphoric esters, and glycols, etc. may be mentioned. The plasticizer in the electrode coating material is preferably 10 to 300 parts by weight, and more preferably 10 to 200 parts by weight with respect to 100 parts by weight of the binder. Note that when an adding quantity of the plasticizer or adhesive is too large, it is liable that strength of the electrode layer 12a remarkably declines. Also, to improve transferability of the electrode layer 12a, it is preferable to improve adhesiveness and/or adherence of the electrode coating material by adding a plasticizer and/or adhesive in the electrode coating material.

After or before forming the electrode coating material layer in a predetermined pattern on the surface of the release layer 22 by a printing method, a blank pattern layer 24 is formed to be substantially the same thickness as that of the electrode layer 12a on the surface of the release layer 22 not formed with the electrode layer 12a. The blank pattern layer 24 is composed of the same material as that of the green sheet and formed by the same method. The electrode layer 12a and the blank layer 22 are dried in accordance with need. The drying temperature is not particularly limited, but is preferably 70 to 120° C., and the drying time is preferably 5 to 15 minutes.

(3) After that, the electrode layer 12a is adhered to the surface of the green sheet 10a. For that purpose, the electrode layer 12a and the blank pattern layer 24 are pressed against the surface of the green sheet 10a together with the carrier sheet 20, heated and pressed to transfer the electrode layer 12a and the blank pattern layer 24 to the surface of the green sheet 10a. Note that when seeing from the green sheet side, the green sheet 10a is transferred to the electrode layer 12a and the blank pattern layer 24.

Heating and pressing at the time of transferring may be pressing and heating by a press or by a calendar roll, but is preferably performed by a pair of rolls. The heating temperature and the pressing force are not particularly limited.

By stacking green sheets formed with a single-layer electrode layer 12a of a predetermined pattern on the single green sheet 10a, a stacked block, wherein a large number of the electrode layers 12a and the green sheets 10a are alternately stacked, is obtained. After that, an outer layer green sheet (a little thicker stacked body obtained by stacking a plurality of green sheets not formed with an electrode layer) is stacked on the lower surface of the stacked body. After that, after forming an outer layer green sheet on the upper side of the stacked body in the same way, final pressure application is performed.

Pressure at the time of the final pressing is preferably 10 to 200 MPa. Also, the heating temperature is preferably 40 to 100° C. After that, the multilayer body is cut to be a predetermined size to form green chips. The green chips are subjected to binder removal processing and firing processing, then, thermal treatment is performed in order to re-oxidize the dielectric layer.

The binder removal processing may be performed under a normal condition, but when using a base metal, such as Ni and a Ni alloy, as a conductive material of the internal electrode layer, it is preferably performed under the specific condition below.

temperature rising rate: 5 to 300° C./hour, particularly 10 to 50° C./hour holding temperature: 200 to 400° C., particularly 250 to 350° C.

holding time: 0.5 to 20 hours, particularly 1 to 10 hours atmosphere: a mixed gas of wet $N_2$ and $H_2$ A firing condition is preferably as below.

temperature rising rate: 50 to 500° C./hour, particularly 200 to 300° C./hour holding temperature: 1100 to 1300° C., particularly 1150 to 1250° C.

holding time: 0.5 to 8 hours, particularly 1 to 3 hours cooling rate: 50 to 500° C./hour, particularly 200 to 300° C./hour atmosphere gas: a mixed gas of wet $N_2$ and $H_2$, etc.

Note that oxygen partial pressure in an atmosphere in the air at firing is preferably $10^{-2}$ Pa or less, particularly $10^{-2}$ to $10^{-8}$ Pa. When exceeding the above ranges, the internal electrode layer tends to oxidize, while when the oxygen partial pressure is too low, abnormal sintering is caused in an electrode material of the internal electrode layer to be broken.

The thermal treatment after performing such firing is preferably performed with a holding temperature or highest temperature of 1000° C. or higher, more preferably 1000 to 1100° C. When the holding temperature or the highest temperature at the time of the thermal treatment is lower than the above ranges, it is liable that oxidization of the dielectric material is insufficient to make the insulation resistance lifetime short, while when exceeding the above ranges, Ni in the internal electrode oxidizes and the capacity decreases, moreover, Ni reacts with a dielectric base and the lifetime also tends to become short. The oxygen partial pressure at the time of thermal treatment is higher than a higher oxygen partial pressure than a reducing atmosphere at the time of firing, preferably $10^{-3}$ Pa to 1 Pa, and more preferably $10^{-2}$ Pa to 1 Pa. When it is lower than the above range, re-oxidization of the dielectric layer 2 becomes difficult, while when exceeding the above ranges, the internal electrode layer 3 tends to oxidize. Other condition of the thermal treatment is preferably as below.

holding time: 0 to 6 hours, particularly 2 to 5 hours cooling rate: 50 to 500° C./hour, particularly 100 to 300° C./hour atmosphere gas: wet $N_2$ gas, etc.

Note that to wet a $N_2$ gas or a mixed gas, etc., for example, a wetter, etc. may be used. In this case, the water temperature is preferably 0 to 75° C. or so. Also, the binder removal processing, firing and thermal treatment may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment.

On the other hand, when performing them separately, after raising the temperature to the holding temperature at the binder removal processing in an atmosphere of a $N_2$ gas or a wet $N_2$ gas, the atmosphere is changed, and the temperature is furthermore raised for firing. After cooling the temperature to the holding temperature at the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode coating material is burnt to form terminal electrodes 6 and 8. For example, a firing condition of the terminal electrode coating material is preferably in a mixed gas of wet $N_2$ and $H_2$ at 600 to 800° C. for 10 minutes to 1 hour or so. In accordance with need, soldering, etc. is performed on the terminal electrodes 6 and 8 to form a pad layer. Note that the terminal electrode coating material may be fabricated in the same way as the electrode coating material explained above.

A multilayer ceramic capacitor of the present invention produced as above is mounted on a print substrate, etc. by soldering, etc. and used for a variety of electronic equipments.

In a method of producing a multilayer ceramic capacitor using the dielectric coating material (green sheet coating material) and the green sheet according to the present embodiment, by combining a binder resin including a butyral based resin as the main component and an adhesive agent composed of a xylene based resin, it becomes possible to produce a green sheet having enough strength to be peeled from a supporting body, preferable adhesiveness and handlability even in the case of an extremely thin green sheet. For example, a thickness of the dielectric layer after firing (a green sheet after firing) can be made as thin as 5 μm or less, preferably 3 μm or less, and more preferably 2 μm or less. Also, the green sheet of the present embodiment is capable of increasing the number of layers to be stacked because the surface roughness is small.

Also, in a production method of a multilayer ceramic capacitor using the dielectric coating material (green sheet coating material) and the green sheet according to the present embodiment, a specific kind of dispersant having a specific range of HLB is used. Therefore, even an extremely thin green sheet of, for example, 5 μm or thinner is strong enough to be peeled from the carrier sheet and has preferable adhesiveness and handlability. Also, surface roughness of the sheet is small and stackability is excellent. Therefore, it becomes easy to stack a large number of green sheets via electrode layers.

Furthermore, in a production method of a multilayer ceramic capacitor using the dielectric coating material (green sheet coating material) and the green sheet according to the present embodiment, an antistatic agent is contained in the dielectric coating material, and the antistatic agent is an imidazoline based antistatic agent. Therefore, even in the case of an extremely thin green sheet of, for example, 5 μm or thinner, it is possible to produce a green sheet having sufficient strength to be peeled from the carrier sheet, wherein electrostatic generated at the time of being peeled from the carrier sheet is suppressed, and the adhesiveness and handlability are preferable. Also, surface roughness of the sheet is small and stackability is excellent. Therefore, it becomes easy to stack a large number of green sheets via electrode layers.

Also, in a production method of a multilayer ceramic capacitor according to the present embodiment, a dry type electrode layer can be easily and highly accurately transferred to the surface of the green sheet without damaging or deforming the green sheet.

Note that the present invention is not limited to the above embodiments and may be variously modified within the scope of the present invention.

For example, a method of the present invention is not limited to the production method of multilayer ceramic capacitors and may be applied as a production method of other multilayer type electronic devices.

Below, the present invention will be explained based on further detailed examples, but the present invention is not limited to the examples.

EXAMPLE 1a

Production of Green Sheet Coating Material

As a starting material of ceramic powder, $BaTiO_3$ powder (BT-02 made by Sakai Chemical Industry Co., Ltd.) was used. A ceramic powder subcomponent additives were prepared to satisfy $(Ba_{0.6}Ca_{0.4})SiO_3$: 1.48 parts by weight, $Y_2O_3$: 1.01 parts by weight, $MgCO_3$: 0.72 wt %, $Cr_2O_3$: 0.13 wt % and $V_2O_5$: 0.045 wt % with respect to 100 parts by weight of the $BaTiO_3$ powder.

First, only the subcomponents were mixed by a ball-mill to obtain slurry. Namely, the subcomponent additives (total amount 8.8 g), ethanol: 6 g, n-propanol: 6 g and xylene: 2 g were preliminary ground by a ball-mill for 20 hours.

Next, the preliminary ground slurry of the subcomponent additives, ethanol: 65 g, n-propanol: 65 g, xylene: 35 g, mineral spirit: 15 g, DOP (dioctyl phthalate) as a plasticizer component: 6 g, a polyethylene glycol based nonionic dispersant (HLB=5 to 6) as a dispersant: 1.4 g and xylene based resin:1.0 g were added to $BaTiO_3$: 191.2 g and mixed by a ball-mill for 4 hours. Note that as the xylene based resin, addition condensation resin (not modified) of methaxylene and formalin was used. An average molecular weight of the resin is 200 to 620. An adding quantity of the xylene based resin to the ceramic powder was 0.5 wt %.

Next, the dispersion coating material was added with 15% lacquer (BH6 made by Sekisui Chemical Co., Ltd. was dissolved in ethanol/n-propanol=1:1) of BH6 (polybutyral resin: PVB) by 6 wt % as a solid content (80 g as a lacquer adding quantity). After that, by ball-milling the dispersion coating material for 16 hours, a ceramic coating material (green sheet coating material) was obtained.

A polymerization degree of a polybutyral resin as the binder resin was 1400, a butyralation degree thereof was 69%±3%, and a residual acetyl group amount thereof was 3±2%. The binder resin was contained by 6 parts by weight in the ceramic coating material with respect to 100 parts by weight of ceramic powder (including ceramic powder subcomponent additives). Also, when assuming that total volume of the ceramic powder, binder resin and plasticizer in the ceramic coating material was 100 volume %, the volume ratio accounted by the ceramics powder was 67.31 volume %.

Also, DOP as a plasticizer was contained in the ceramic coating material by 50 parts by weight with respect to 100 parts by weight of the binder resin. Water was contained by 2 parts by weight with respect to 100 parts by weight of the ceramic powder. The polyethylene glycol based nonionic dispersant as a dispersant was contained by 0.7 part by weight with respect to 100 parts by weight of the ceramic powder.

Also, in the coating material, mineral spirit of at least any one of a hydrocarbon based solvent, industrial gasoline, kerosene and solvent naphtha was added by 5 parts by weight with respect to 100 parts by weight of the ceramic powder. Furthermore, the coating material contains an alcohol based solvent and an aromatic solvent as a solvent. When assuming that total weight of the alcohol based solvent and aromatic solvent was 100 parts by weight, xylene as an aromatic solvent was contained by 15 parts by weight.

Viscosity of the coating material was 180 mPa·s. The viscosity of the coating material was measured by using a B-type viscosimeter and using S21 as a rotor, and measurement was made at a temperature of 25° immediately after the coating material was obtained. The rotation rate at the time of measurement was 50 rpm.

Production of Green Sheet

The coating material obtained as above was applied to a PET film as a supporting film by the doctor blade and dried to produce a green sheet having a thickness of 12 μm.

Evaluation of Green Sheet

After that, evaluation was made on surface roughness, sheet tensile strength, adhesiveness (stackability, release strength) and a total evaluation of the green sheet. The results are shown in Table 1.

Note that the surface roughness was obtained by measuring average surface roughness Rz by using a surface roughness measuring device made by Kosaka Laboratory Ltd. The sheet tensile strength was obtained by using a tensile test machine of Instron 5543, preparing 5 sheets cut to be a dumbbell shape as samples, pulling the samples respectively at a tensile rate of 8 mm/min., obtaining strength and stretch at the time of breaking and calculating an average value.

The adhesiveness was evaluated as below. First, 10 samples obtained by cutting a dried sheet to 50 mm×15 mm were prepared, and 5 sets obtained by adhering two of the samples each were prepared. Each of the sheet sets was adhered under a condition of 70° C. for one minute under about 4 MPa. After that, surfaces of the sheets of each set were applied two-sided tape, the sheets of each set were pulled in the direction of detaching by using the tensile test machine of Instron 5543, and release strength at the time of being detached was measured. The higher the release strength, the more excellent it is in adhesiveness.

In the total evaluation, those having surface roughness of 0.3 μm or less, sheet tensile strength of 6.5 MPa or more, and release strength of adhesiveness of 20 $N/cm^2$ or more were determined to be good (o), and those not satisfying even one of the conditions were determined to be defective (x). Note that "*" in front of a number in the table indicates that it exceeds a preferable range. It is the same also in Tables below.

EXAMPLE 1b

Other than using a polyol-modified xylene based resin (an average molecular weight: 700-1000) obtained by modifying the addition condensation resin of methaxylene and formalin by polyol as a xylene based resin, a green sheet was produced in the same way as in the example 1a, and the same evaluation was made. The results are shown in Table 1.

COMPARATIVE EXAMPLE 1a

Other than not adding the xylene based resin, a green sheet was produced in the same way as in the example 1a, and the same evaluation was made. The results are shown in Table 1.

COMPARATIVE EXAMPLES 1b TO 1h

Other than using the tackifier shown in Table 1 instead of a xylene based resin, a green sheet was produced in the same way as in the example 1a, and the same evaluation was made. The results are shown in Table 1.

TABLE 1

|  | Tackifier Kind | Adding Quantity (PHP) | Surface Roughness (μm) | Tensile Strength (MPa) | Adhesiveness (N/cm$^2$) | Evaluation |
| --- | --- | --- | --- | --- | --- | --- |
| Example 1a | Xylen Based Resin "a" | 0.5 | 0.26 | 7.10 | 21.3 | ○ |
| Example 1b | Xylen Based Resin "b" | 0.5 | 0.27 | 6.82 | 21.3 | ○ |
| Comparative Example 1a | Not Added | 0 | *0.31 | 7.31 | 20.6 | x |
| Comparative Example 1b | Petroleum Resin "a" | 0.5 | *0.35 | 7.73 | *16.3 | x |
| Comparative Example 1c | Petroleum Resin "b" | 0.5 | *0.33 | 7.95 | *10.8 | x |
| Comparative Example 1d | Rosin Based Resin "a" | 0.5 | *0.35 | 7.78 | *14.1 | x |
| Comparative Example 1e | Rosin Based Resin "b" | 0.5 | *0.31 | 7.67 | *10.1 | x |
| Comparative Example 1e | Terpene Based Resin "a" | 0.5 | 0.29 | 6.86 | *10.5 | x |
| Comparative Example 1f | Terpene Based Resin "b" | 0.5 | 0.27 | *5.92 | *12.3 | x |
| Comparative Example 1g | Acrylic Resin "a" | 0.5 | *0.38 | *5.92 | *16.9 | x |
| Comparative Example 1h | Acrylic Resin "b" | 0.5 | *1.03 | *4.63 | *10.2 | x |

Evaluation 1

As shown in Table 1, it was confirmed that the green sheets according to the examples exhibited improved surface roughness and adhesiveness comparing with the case of not adding a xylene based resin. Also, in the cases of other tackifier, it was confirmed that the adhesiveness and/or tensile strength declined and surface roughness deteriorated comparing with the case of not adding.

EXAMPLES 2a TO 2d

As shown in Table 2 below, other than changing an adding quantity of a xylene based resin in a range of 0.1 to 1.5 wt % (PHP) with respect to the ceramic powder, a green sheet was produced in the same way as in the example 1a, and the same evaluation was made. The results are shown in Table 2.

TABLE 2

|  | Tackifier Kind | Adding Quantity (PHP) | Surface Roughness (μm) | Tensile Strength (MPa) | Adhesiveness (N/cm$^2$) | Evaluation |  |
| --- | --- | --- | --- | --- | --- | --- | --- |
| Comparative Example 1a | Not Added | 0.0 | *0.31 | 7.31 | 20.6 | x |  |
| Example 2a | Xylen Based Resin a | 0.1 | 0.3 | 7.28 | 20.6 | ○ |  |
| Example 2b | Xylen Based Resin a | 0.5 | 0.26 | 7.10 | 21.3 | ○ | Same as Example 1a |
| Example 2c | Xylen Based Resin a | 1.0 | 0.28 | 6.82 | 22.0 | ○ |  |
| Example 2d | Xylen Based Resin a | 1.5 | *0.35 | 6.53 | 23.1 | x |  |

Evaluation 2

It was confirmed that it is preferable to add a xylene based resin in a range of 1.0 wt % or less, more preferably 0.1 or more and 1.0 wt % or less, and particularly preferably more than 0.1 and 1.0 wt % or less. Also, it was confirmed that, when the adding quantity of the xylene based resin was too small, adhesiveness tended to decline, while when the adding amount was too large, the adhesiveness improves but it was liable that surface roughness increases, stacking of layers by a large number became difficult, tensile strength of the sheet declined, and handlability of the sheet declined.

COMPARATIVE EXAMPLES 3a AND 3b

Other than using a polyvinyl acetal resin (PVAc) of a production number BX-1 made by Sekisui Chemical Co., Ltd. and an acrylic resin (MMA-BA) having a molecular weight of 450000 and a Tg of 70° C. instead of PVB as a binder resin as shown in Table 3, a green sheet was produced in the same way as in the example 1, and the same evaluation was made. The results are shown in Table 3.

TABLE 3

| | Binder Resin Kind | Resin Adding Quantity (PHP) | Surface Roughness (μm) | Tensile Strength (MPa) | Adhesiveness (N/cm²) | Evaluation |
|---|---|---|---|---|---|---|
| Example 1a | PVB | 6 | 0.26 | 7.10 | 21.3 | o |
| Comparative Example 3a | PVAc | 6 | *0.62 | 6.6 | *3.2 | x |
| Comparative Example 3b | Acryl(MMA-BA) | 6 | *0.51 | *1.2 | *6.6 | x |

Evaluation 3

As shown in Table 3, it was confirmed that a polyvinyl butyral resin (PVB) was preferable as a binder resin. Namely, a combination of PVB as a binder resin and a xylene based resin as a tackifier was confirmed to be preferable in terms of improving surface roughness, tensile strength and adhesiveness of the green sheet.

As explained above, according to the present invention, it is possible to provide a green sheet coating material, a green sheet, a production method of a green sheet coating material and a production method of a green sheet capable of producing a green sheet having enough strength to be peeled from a supporting body, preferable adhesiveness and handlability even in the case of an extremely thin green sheet. Therefore, it is possible to provide a production method of an electronic device suitable to making the electronic device thin and multilayer.

The invention claimed is:

1. A green sheet coating material, comprising ceramic powder and a binder resin containing a butyral based resin as the main component; and
furthermore comprising a xylene based resin as a tackifier.

2. The green sheet coating material as set forth in claim 1, wherein said xylene based resin is contained in a range of 1.0 wt % or less with respect to 100 parts by weight of said ceramic powder.

3. The green sheet coating material as set forth in claim 1, wherein
said butyral based resin is a polybutyral resin; and
a polymerization degree of said polybutyral resin is 1000 or higher and 1700 or lower, a butyralation degree of the resin is higher than 64% and lower than 78%, and a residual acetyl group amount is less than 6%.

4. The green sheet coating material as set forth in claim 1, wherein said binder resin is contained by 5 parts by weight or more and 6.5 parts by weight or less with respect to 100 parts by weight of said ceramic powder.

5. The green sheet coating material as set forth in claim 1, containing dioctyl phthalate as a plasticizer by 40 parts by weight or more and 70 parts by weight or less with respect to 100 parts by weight of said binder resin.

6. A production method of a ceramic green sheet, comprising the steps of:
preparing a green sheet coating material as set forth in claim 1; and
forming a ceramic green sheet by using said green sheet coating material.

7. A production method of a ceramic electronic device, comprising the steps of:
preparing a green sheet coating material as set forth in claim 1;
forming a ceramic green sheet by using said green sheet coating material;
drying said green sheet;
stacking dried green sheets via internal electrode layers to obtain a green chip; and
firing said green chip.

8. A green sheet produced by using a green sheet coating material as set forth in claim 1.

9. The green sheet coating material as set forth in claim 1, wherein said xylene based resin is an addition condensation resin of methaxylene and formalin, or those obtained by modifying the addition condensation resin.

* * * * *